Nov. 13, 1956 — L. H. HOBSON — 2,770,560
METHOD OF EMPLACING MORTAR
Filed July 27, 1954
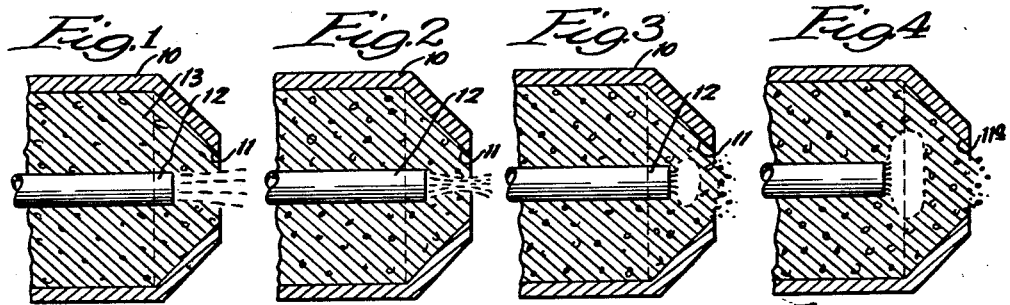
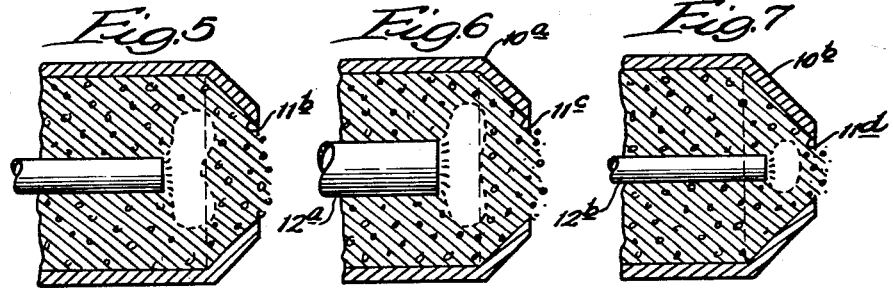
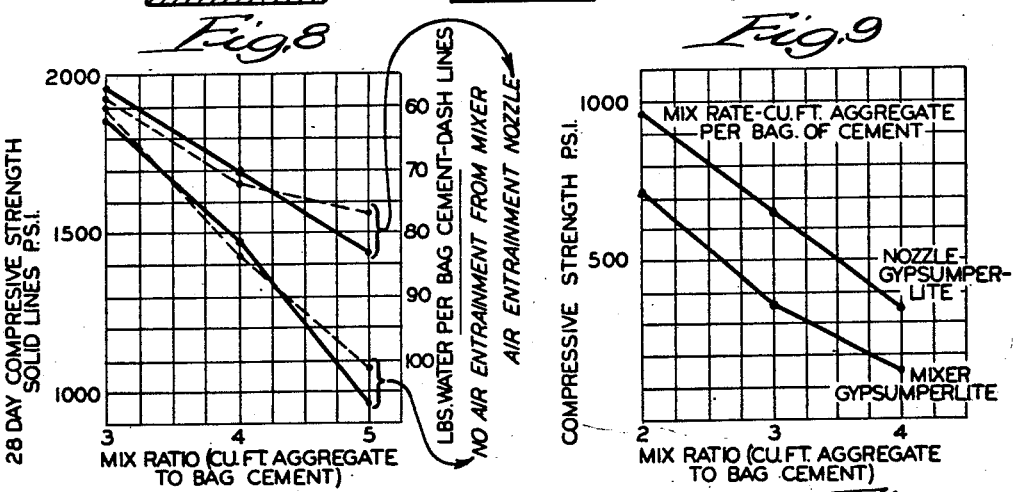
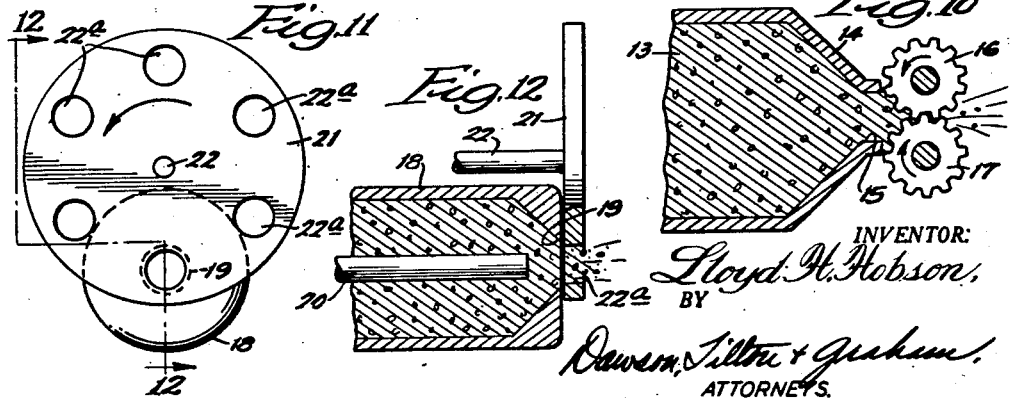
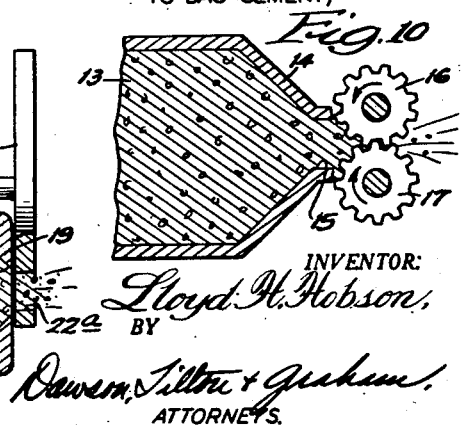
INVENTOR:
Lloyd H. Hobson,
BY
Dawson, Tilton & Graham
ATTORNEYS

United States Patent Office 2,770,560
Patented Nov. 13, 1956

2,770,560
METHOD OF EMPLACING MORTAR

Lloyd H. Hobson, Lemont, Ill., assignor to E-Z-On Corporation, Chicago, Ill., a corporation of Illinois Application July 27, 1954, Serial No. 446,133

8 Claims. (Cl. 117—104)

This invention relates to a method of emplacing mortar in the forming of walls and in the coating of walls and the forming of curtains and other surfaces. The invention is particularly useful in connection with the emplacement of mortars formed by the use of binders such as hydraulic cement or gypsum, and in combination with aggregates, including lightweight aggregates.

While the desirability of applying mortars through nozzles and under pressure has been appreciated, very serious problems have interfered with such desired commercial use. When water is added in an amount sufficient to render the material flowable, the resulting structure is greatly weakened because of the large amount of water in the mortar, and further, when the optimum amount of water is added, the pressure required to force it through a pipe to the nozzle is excessive. Also, it is practically impossible to break such a mix into spray or minute particles for the smooth and even application of the material on the desired surface. Where wooden forms are employed, tamping is required when the optimum or minimum proportion of water is used. A large amount of water is usually added to the mortar for the purpose of increasing the flowability or "slump" of the mortar, but when the water is later evaporated, a porous or weak structure is formed. "Slump" is determined by a standard tester which is a form defining a frustro-conical chamber having a base eight inches in diameter, a top four inches in diameter, and a height of twelve inches. In the test, the form is filled with mortar and then inverted upon a flat surface and lifted off. The height of the column is then taken as the measure of the slump or flowability. If the column measures eight inches after removal of the form, the mix has a "slump" of four inches. Since the test is a well known and standard test, further description is believed unnecessary.

Plaster or mortar mixes contain some air, and entrainment agents have been employed with Portland cement and gypsum, which tend to entrain air into the mix. In some instances where a lightweight concrete is used for roof decks or other structures which are to have good sound and heat insulation properties, the lightweight aggregate mix has contained a substantial volume of air and the mass of the air remains in the mortar when it is emplaced.

I have discovered that a minimum of water can be employed while at the same time utilizing air as an effective means for bringing about flowability of the mortar mix, the bulk of the air being later removed at the time of the application of the mortar. By introducing a very substantial amount of air, I obtain the necessary flowability or slump while using a minimum quantity of water, and by removing the air in the area of the discharge from the nozzle, the resulting emplaced plaster is found to contain a minimum of water and air and to form a structure of great strength. When a non-hydraulic binder such as gypsum is used, and in the mixture of which there is incorporated a substantial amount of air, I find that a gypsum plaster of greatly increased strength is obtained where the bulk of the air is removed as the plaster is discharged or applied to the surface.

An object of my invention is to provide a process which overcomes the disadvantages described above while providing an emplaced mortar containing a minimum of moisture and air. A further object is to provide a process for incorporating air into a mortar or cementitious mix containing a very small amount of water and then, after utilizing the introduced air to promote the flowability of the material in the applying pipe or nozzle, removing the bulk of the introduced air from the material being emplaced. A still further object is to provide a process wherein a mortar mix containing a large amount of air is subjected to treatment for removal of the air at the point of discharge or prior to the deposition of the mix upon a surface. Yet a further object is to provide a method wherein a high degree of flowability of a mix is provided by the entrainment or incorporation therein of large amounts of air, the mix having a decreased water content, the bulk of the air being removed to provide a resulting structure of great strength. Other specific objects and advantages will appear as the specification proceeds.

The invention is shown in illustrative embodiments by the accompanying drawings, in which —

Figure 1 is a broken longitudinal sectional view of apparatus which may be employed in the practice of the method; Fig. 2, a view similar to Fig. 1 but showing the mortar converging radially inwardly about the air stream and reducing the cross-sectional area of the stream; Fig. 3, a view similar to Figs. 1 and 2 but showing the discharge of a mass of mortar from the nozzle; Figs. 4 and 5, views similar to the preceding views but showing the effect of enlarging the nozzle orifice; Fig. 6, a view similar to Fig. 1 but showing an enlarged orifice designed to provide a frequency of about sixty cycles per second; Fig. 7, a view similar to Fig. 6 but showing a nozzle outlet opening of reduced diameter and a differently located and smaller air tube, the proportions being such as to produce a frequency of about 600 to 700 cycles per second whereby substantially all of the entrained air is removed; Fig. 8, a graph showing the 28-day compressive strength and pounds of water per bag of cement for various mix ratios; Fig. 9, a graph showing the compressive strength for ratios of perlite and gypsum emplaced by my process as compared with the same mixes direct from the mixer; Fig. 10, a broken sectional view of a modified form of apparatus employed for the removal of air from the mix just prior to the application of the material to a surface; Fig. 11, a front view in elevation of another modified form of apparatus effective for the removal of air from the mix; and Fig. 12, a broken sectional view showing the structure illustrated in Fig. 11.

In one embodiment of my invention, mortar is formed by combining a binder with aggregate. The binder may consist of Portland cement, gypsum, lumnite, colloidal clays, wheat flour, and a number of other cementitious materials. The aggregate may consist of sand, expanded mica, expanded silica, pumice (Hadite), crushed stone, expanded slags, and other suitable and well-known materials.

To the binder and aggregate I add preferably a minimum quantity of water. This will include the water of hydration and will include enough water to wet the mixture throughout. It will be understood that for certain purposes, more water will be desired than for other purposes, but generally it is my object to reduce the water content to a minimum so that when the product is eventually emplaced there will be a minimum of voids formed by the evaporation of moisture and the resulting structure will be of high strength. It is desirable that the water not exceed an amount which would produce a three-inch slump. I prefer that the amount of water be less than that necessary to produce a two-inch slump. I have found that very successful operations can be carried through where the water added does not produce substantially any slump.

After the addition and mixing of the water with the binder and aggregate, I next incorporate air in the mixture. The air may be incorporated in any suitable manner. It may be incorporated by use of an air-entraining agent, and in some instances the air may be incorporated by mechanically working the mixture. Air-entraining agents are well known and need not be described in detail. For example, Vinsol resin, which is defined on page 605 of "Handbook of Material Trade Names," by Zimmerman & Levine (TP12.Z72, 1953), may be employed. An air-entraining agent produced and sold by Procter & Gamble Company under the trademark "Orvus" and which contains sodium alkyl aryl sulfonate as the active ingredient, may be used. Soap bark may also be employed. Wetting agents which are effective in lowering surface tension and bringing air about the particles and forming bubbles within the mixture for retaining air, are well known. It is common to employ in Portland cement and in gypsum certain agents which are effective in entraining air into the mix. In view of the general use of entraining agents, it is believed unnecessary to define them further herein.

As above stated, the air may be incorporated into the mix by mechanical means as by employing mixers which mechanically, during the beating operation, force air into the mixture to greatly increase the air content of the mixture.

I prefer to incorporate into the mix substantial volumes of air, varying from 6% to 50%. The range which I prefer is from 10% to 30%.

The incorporation of a large volume of air into the mix gives it high mobility and I find that the mix can be thus forced through a nozzle and distributed in the form of a fine spray for effective application to a surface. However, since the mobility of the mix is no longer needed after the discharge of the material from the nozzle, and since, in the final wall or coating formed by the mortar, I desire to have as little air as possible within the material for the purpose of greater strength, I provide means for the elimination of air to a very great extent at the area of discharge. I find that the bulk of the air can be removed in this area and a further beneficial effect of the air is here found further in that the breaking of the air bubbles, etc. for the release of the air aids in the forming of the fine spray and eventually in the production of an even coating of the material on the wall or other surface.

A number of devices may be employed for the removal of the air, and it will be understood that any of these may be employed in the area of the discharge of the material. In Figs. 1 to 7, inclusive, I have set forth a single type of structure which may be used for the removal of air, the structure consisting of a nozzle having a discharge port and an air pipe therein, from which compressed air is discharged. By correlating the size of the air pipe with the size of the orifice or outlet of the nozzle and the spacing between the two, etc., I find that air can be effectively removed from the mortar which is discharged under pressure from a mortar pump through the orifice of the nozzle. In the structure shown in Fig. 10, the mortar is discharged under the pressure of the mortar pump between revolving gears which break up the material into fine particles, thus releasing the air from the particles. Similarly, in the structure shown in Figs. 11 and 12, a mechanical device is provided for breaking up the material for the release of air. The structures described are merely illustrative of a large number of devices that may be employed for the separation of air, and it will be understood that in the practice of my invention any means may be utilized for the removal of air from the mix near or in the area of discharge of the material from the nozzle and when the air no longer serves a useful purpose.

Referring more particularly to the drawings, there is shown in Figs. 1, 2 and 3 a nozzle 10 having an orifice 11 and a compressed air pipe 12. As the mortar is forced outwardly, the mortar 13, under the influence of the mortar pump, converges radially inwardly about the air stream emerging from pipe 12, as shown more clearly in Fig. 2, and reduces the cross-sectional area of the stream. The velocity of the air stream correspondingly increases with a still further drop in static head, which in turn promotes a still further intrusion of the mortar into the air stream. The intrusion of the mortar may in certain nozzle sizes and under certain velocities actually produce a momentary cut-off of air, while in other instances there is no complete closure of the air stream. The matter is not important as regards the practice of the invention. It will be understood that in the foregoing operation the mortar is compacted and pressurized by a plaster pump (not shown) of the type ordinarily employed, to force the plaster around the issuing air stream to reduce its diameter and the static pressure of the air stream to a point where a globule or small, more or less discrete mass of mortar is finally expelled at high speed, as illustrated in Fig. 3. This results in the mass being broken up into a fine, evenly-dispersed spray, and this is deposited in a substantially uniform coating upon the wall or other surface.

Figs. 4 and 5 show nozzles of increasing diameters, Fig. 4 showing a nozzle 11a and Fig. 5 showing a nozzle 11b. When a larger orifice is used, a larger globule of mortar is ejected and the frequency is lower. With the lowering of the frequency, it is found that a smaller proportion of entrained air will be removed. In Fig. 6, I have shown a nozzle 10a having an enlarged nozzle outlet 11c and having also a relatively large compressed air pipe 12a. The proportions of the parts here shown have been found to be effective in giving a frequency of only about 60 cycles per second and there is removed a much smaller proportion of entrained air. In contrast, there is shown in Fig. 7 a nozzle 10b having a relatively small nozzle orifice 11d, while a pipe 12b of small diameter is employed therewith, the latter structure being so proportioned as to give a frequency of 600 to 700 cycles per second. The latter arrangement has been found to be effective in removing practically all of the entrained air.

It is generally unnecessary to operate at frequencies above the range of 600 to 700 cycles per second, but for certain purposes a high frequency may be desired. I believe that the amount of entrained air expelled is substantially a straight line function of the frequency over a range of about 60 to 600 cycles per second.

In the modified form of structure shown in Fig. 10, the nozzle 14 is provided with a discharge outlet 15 through which the mortar 13 is forced by the mortar pump into the area between the rotating gears 16 and 17. Gears 16 and 17 are rotated at a high speed so as to break up and finely divide the masses of the mortar so as to relieve the pressure upon the air trapped within the masses and permit its almost instantaneous release. As a result of the action of the gears, the mortar is discharged in the form of a fine spray upon the selected surface.

In the structure shown in Figs. 11 and 12, the nozzle 18 is provided with a discharge orifice 19, and a compressed air pipe 20 is employed as a means for forming the mist or spray of mortar. A disk 21 carried by shaft 22 is rotated rapidly so as to bring the discharge openings 22a successively into register with the nozzle outlet 19. Thus the periodicity of the discharge is controlled by the speed of rotation of the shaft 22. It is found that the frequency of discharge can be controlled in this manner so as to give a finely-divided spray from which there is a release of the entrapped air, and the spray, substantially free of air, is deposited upon the selected surface.

Fig. 8, as set out in the drawing, is a graph showing the 28-day compressive strength and pounds of water per bag of cement for various ratios of aggregate and Portland cement commonly employed and as emplaced by my process in comparison with the same mixes direct from the mixer. Fig. 9 is a graph showing the 28-day compressive strength for various mix ratios of perlite and gypsum as emplaced by my process and as compared with the same mixes direct from the mixer.

The following data show the effects of the nozzle settings of Figs. 5 and 7 upon the amount of entrained air removed by the invention. In this test, a standard mix of 1 cubic foot of Portland cement to 4 cubic feet of perlite was used. The control mix was made up by weight as follows:

|  | Pounds |
|---|---|
| Portland cement | 95 |
| 4 cu. ft. perlite | 32 |
| Water | 71 |
| Air entraining | 0 |
| Total | 198 |

One cubic foot of this mix direct from the mixer weighed 69.5 lbs., thus giving a total volume of the mix of 2.85 cubic feet. The slump was practically zero, being so small that it was impossible to measure.

A 1:4 mix of Portland cement-perlite was made up, with 71 pounds of water, but with 8 oz. of an air entrainment agent added. This mix as taken from the mixer had a specific weight of 36.5 pounds or a total volume of 5.45 cubic feet, indicating 2.60 cubic feet of entrained air. One cubic foot of this mix passed through a nozzle having the Fig. 5 setting weighed 44 pounds or a total volume of 4.5 cubic feet, while one cubic foot passed through the nozzle with Fig. 7 setting had a specific weight of 68 pounds or a total indicated volume of 2.92 cubic feet.

It is therefore clear that the Fig. 5 setting removed about 36.5% of the entrained air while the nozzle setting shown at Fig. 7 removed practically all of the entrained air, that is, over 97%.

An identical mix was then made up but with one pound of an air-entraining agent added, the total weight being 199 pounds. The weight of one cubic foot of this mix direct from the mixer was 38.5, indicating a total volume of 5.17 cubic feet. As there were 2.85 cubic feet in the same mix without air entraining, it is clear that there were 2.35 cubic feet of air in the second mix. When pumped through a nozzle adjusted as shown in Fig. 5, one cubic foot of the mix weighed 49.5 pounds or a total indicated volume of 4.02 cubic feet. Since the mix originally had 2.32 cubic feet of entrained air at the mixer, and 1.17 cubic feet of air after passing the nozzle, it is clear that about 50% of the entrained air was removed.

One cubic foot of the same mix as in the preceding paragraph, when pumped through a nozzle having a setting as in Fig. 7, had a weight of 66 pounds for a total volume of 3.02 cubic feet, thus indicating removal of about 93% of entrained air. In this test the nozzle used had a 5/16" orifice opening, an air tube 3 of 1/8" inside diameter with its end 3/8" back of the orifice opening.

By varying the frequency, as described above, I am able to control the amount of air remaining in the emplaced material through very wide ranges. This frequency can be measured by known meters and it can be noted also aurally. For example, the emerging mortar produces a "squeal," whose pitch increases with increasing frequency. Furthermore, the small masses emerging can be seen in the high speed photographs, and it can be shown in like manner that their separation, that is, the frequency, depends upon the variables previously explained. As previously stated, the frequency may be varied inversely with the size of the orifice; or varied directly with the air stream velocity, either by varying the pressure and thus the volume of air per unit time, or by varying the diameter of the air stream and holding the pressure constant. It is contemplated that a chart be prepared for standard mortar mixes, giving the physical volumes and/or settings of a nozzle and air pressures for any desired frequency over the range of frequencies to be used in practice.

Specific examples may be set out as follows for illustrating the standard or conventionally used mixes of Portland cement and perlite, gypsum and perlite, and gypsum and sand, and thus illustrating the advantages of the new process. In the following examples relating to Portland cement and perlite, the legend "PP3" indicates one part of Portland cement to 3 parts of perlite, while "APP3" identifies the same mix with air entrained therein as previously described.

*Example 1*

|  | PP3 (Weight, lbs.) | APP3 (Weight, lbs.) |
|---|---|---|
| Portland Cement | 90 | 94 |
| Perlite | 24 | 25 |
| Water | 60 | 58 |
| Air Entraining | 0 | 8 oz. |
| Total Weight of Mix | 174 | 177.5 |
| Weight, 1 cu. ft. from Mixer | 86 | 55 |
| Weight, 1 cu. ft. from Hose |  | 57 |
| Weight, 1 cu. ft. from Nozzle |  | 78 |
| Compressive Strength (p. s. i.) from Mixer | 1,878 | 435 |
| Compressive Strength (p. s. i.) from Nozzle |  | 1,956 |
| Cu. ft. from Mixer | 2.03 | 3.23 |
| Cu. ft. from Nozzle |  | 2.27 |
| Slump from Mixer | 5½" | 5½" |

*Example 2*

|  | PP4 (Weight, lbs.) | APP4 (Weight, lbs.) |
|---|---|---|
| Portland Cement | 94 | 95 |
| Perlite | 32 | 32 |
| Water | 83 | 71 |
| Air Entraining | 0 | 8 oz. |
| Total Weight of Mix | 209 | 198.5 |
| Weight, 1 cu. ft. from Mixer | 82 | 51.5 |
| Weight, 1 cu. ft. from Hose |  | 54 |
| Weight, 1 cu. ft. from Nozzle |  | 75 |
| Compressive Strength (p. s. i.) from Mixer | 1,460 | 435 |
| Compressive Strength (p. s. i.) from Nozzle |  | 1,692 |
| Cu. ft. from Mixer | 2.55 | 3.85 |
| Cu. ft. from Nozzle |  | 2.64 |
| Slump from Mixer | 5½" | 5¼" |

*Example 3*

|  | PP5 (Weight, lbs.) | APP5 (Weight, lbs.) |
|---|---|---|
| Portland Cement | 91 | 93 |
| Perlite | 40 | 40 |
| Water | 100 | 76 |
| Air Entraining | 0 | 10 oz. |
| Total Weight of Mix | 231 | 209.6 |
| Weight, 1 cu. ft. from Mixer | 78 | 48 |
| Weight, 1 cu. ft. from Hose |  | 50.5 |
| Weight, 1 cu. ft. from Nozzle |  | 72 |
| Compressive Strength (p. s. i.) from Mixer | 960 | 250 |
| Compressive Strength (p. s. i.) from Nozzle |  | 1,415 |
| Cu. ft. from Mixer | 2.96 | 4.37 |
| Cu. ft. from Nozzle |  | 2.94 |
| Slump from Mixer | 5½" | 5¼" |

Example 4

| GP2 | Weight (lbs.) | Compressive Strength (in p. s. i.) |
|---|---|---|
| Gypsum | 101 | |
| Perlite | 16 | |
| Water | 69 | |
| Total Weight of Mix | 186 | |
| Weight, 1 cu. ft. from Mixer | 76 | Mixer, 716. |
| Weight, 1 cu. ft. from Hose | 77 | Hose, 722. |
| Weight, 1 cu. ft. from Nozzle | 84 | Nozzle, 980. |
| Cu. ft. from Mixer | 2.45 | |
| Cu. ft. from Nozzle | 2.22 | |
| Volume Reduction____percent__ | 10 | |

Example 5

| GP3 | Weight (lbs.) | Compressive Strength (in p. s. i.) |
|---|---|---|
| Gypsum | 98 | |
| Perlite | 26 | |
| Water | 85 | |
| Total Weight of Mix | 209 | |
| Weight, 1 cu. ft. from Mixer | 67 | Mixer, 353. |
| Weight, 1 cu. ft. from Hose | 70 | Hose, 425. |
| Weight, 1 cu. ft. from Nozzle | 80.5 | Nozzle, 665. |
| Cu. ft. from Mixer | 3.11 | |
| Cu. ft. from Nozzle | 2.58 | |
| Volume Reduction____percent__ | 17 | |

Example 6

| GP4 | Weight (lbs.) | Compressive Strength (in p. s. i.) |
|---|---|---|
| Gypsum | 98 | |
| Perlite | 34 | |
| Water | 109 | |
| Total Weight of Mix | 241 | |
| Weight, 1 cu. ft. from Mixer | 59 | Mixer, 158. |
| Weight, 1 cu. ft. from Hose | 62.5 | Hose, 175. |
| Weight, 1 cu. ft. from Nozzle | 75.5 | Nozzle, 358 |
| Cu. ft. from Mixer | 4.09 | |
| Cu. ft. from Nozzle | 3.20 | |
| Volume Reduction____percent__ | 22 | |

Example 7

| GP3 | Weight (lbs.) | Compressive Strength (in p. s. i.) |
|---|---|---|
| Gypsum | 102 | |
| Sand | 268 | |
| Water | 75 | |
| Total Weight of Mix | 445 | |
| Weight, 1 cu. ft. from Mixer | 120 | Mixer, 360. |
| Weight, 1 cu. ft. from Hose | 121.5 | Hose, 376. |
| Weight, 1 cu. ft. from Nozzle | 129 | Nozzle, 465. |
| Cu. ft. from Mixer | 3.68 | |
| Cu. ft. from Nozzle | 3.44 | |
| Volume Reduction____percent__ | 6.5 | |

Examples 1, 2 and 3 illustrate the advantages inherent with my process in connection with Portland cement and the added strength of mortar so emplaced. It will be noted that, referring to Example 1, without air entrainment, one cubic foot of mix weighs 86 pounds. As the total weight of ingredients was 174 pounds, the volume of the mix direct from the mixer was 2.025 cubic feet. For a substantially identical mix, using a half pound of an air entraining agent, the corresponding volume was 177.5/55 or 3.23 cu. ft., thus indicating that the volume of entrained air was 3.23−2.025 or about 1.2 cu. ft. or 37.2% of the total volume. However, when weighed after passing the nozzle, one cubic foot of this mix weighed 78 pounds, giving a total volume of 2.275 cu. ft. from the nozzle and indicating a total volume of 0.25 cubic foot of entrained air. It is, therefore, clear, in this example, that in passing through the nozzle, the mix had removed therefrom 1.2−.25 or .95 cu. ft. of air. In other words, over 79% of the entrained air was removed before emplacement of the mix. In short, the emplaced mix had only about 11% of the air originally entrained remaining after emplacement.

Furthermore the mix from the nozzle while lighter by 8 pounds per cubic foot than the mix without air entrainment, had a 28-day compressive strength of 1956 p. s. i. as compared with 1878 p. s. i. for the mix without air entrainment. It is to be noted also that less water was used in the mix with air entrainment than in that without such entrainment.

The results in connection with Example 2 are even more striking and are moreover of more practical importance, since the mix there tested is more nearly of the proportions commonly used. In this example, it will be noted that 12 pounds less water per bag of cement were used with a half pound of air entraining agent, but that, nevertheless, the mix had an even greater slump or flowability than the mix without entrained air. In the "PP4" example the weight per cubic foot of mix from the mixer was 82 pounds, giving a total of 2.55 cubic feet of mix. With the same proportions of ingredients and air entrainment, but with 12 pounds or .192 cu. ft. less water, the total volume direct from the mixer was 3.85 cu. ft. However, when taken from the nozzle, the mix with air entrainment had a weight per cubic foot of 75 pounds, thus indicating a total volume of 2.64 cu. ft. Comparing these values without adjustment for the 12 pounds less water used in the "APP4" mix, the mix after passing the nozzle had but .09 cu. ft. air. As the figures indicate, 1.3 cu. ft. of air direct from the mixer, it is clear that about 93% of the entrained air was removed by my process. Furthermore, the "APP4" mix had a slump or flowability about 10% greater than the corresponding mix without air entrainment, and a 28-day compressive strength of 1692 p. s. i. as compared with 1460 p. s. i. for the mix without air entrainment after placement by my process, while being lighter by 7 pounds per cubic foot or 8.5%, than the corresponding mix without air entrainment, had an increase of 15.9 in compressive strength.

Turning to Example 3, a "PP5" mix of 1 part Portland cement and 5 parts of perlite was tested and it is to be noted that 24 pounds or 0.385 cu. ft. less water was used with the mix using 10 oz. of air entraining agent. The total indicated volume from the mixer without air entrainment was 2.96 cubic feet, while with air entrainment the corresponding total volume was 4.37 cu. ft., thus indicating 1.41 cu. ft. of entrained air. However, after processing, the "APP5" mix had a total volume of 2.94 cu. ft., which is substantially the same volume as obtained from mix "PP5." Nevertheless the slump or flowability of the "APP5" mix was materially greater despite the large reduction in water content; and it had the remarkable increase of over 47% in 28-day compressive strength, together with a reduced weight of 6 pounds per cubic foot of the wet mix.

Plotting the test figures as in Fig. 8 with abscissae as mix ratios of cubic feet of aggregate to 1 bag cement, that is, 1 cubic foot, of Portland cement, with ordinates of 28-day compressive strength, and assuming substantially straight line variation of the values, it is clear that my process, while greatly reducing labor costs, as will be subsequently explained, also results in a large increase of compressive strength for any given mix ratio or, alternatively, a material increase in the proportion of aggregate used for any given maximum strength. For example, assume a required 28-day compressive strength of 1500 p. s. i., it is clear that the ratio of aggregate can be increased from about 1:3.9 in the case of a mix without air entrainment and applied directly from the mixer, to about 1:4.7 with air entrainment and emplacement in accordance with the invention. Moreover, the resulting structure is materially lighter per cubic foot because of the lower density of the aggregate over cement, and has greater durability and resistance to the deleterious effects of temperature changes and moisture. It is to be noted further that over the range investigated the rate of decrease of strength with increased ratios of aggregate to cement is unexpectedly smaller with my process than for the corresponding mixes without air entrainment. That is to say, the savings in material costs are greater with increased ratios of aggregate to cement.

Gypsum plaster as received from the manufacturer commonly has an air entraining agent incorporated therein as a retarder to control the set of gypsum, and the retarder inherently entrains air and weakens the plaster. If we should intentionally entrain more air in the gypsum, the reduction in water content would be so small it could hardly be measured. Therefore, the air inherently entrained by the retarder is not a desirable feature and it is almost always desirable to separate this air before the plaster is applied to the wall. Consequently, it is difficult to make tests on a comparative basis between such material with and without air entrainment. Examples 4, 5 and 6, wherein the slump was very nearly zero, show the effects of my process upon air entrainment and compressive strength for mixes having perlite-gypsum ratios of 2, 3 and 4, respectively. Thus in Example 4, the mix taken from the nozzle had an increase of 10.5% in specific weight over the corresponding mix direct from the mixer, but 37% increase in compressive strength. In Example 5, there was a 20.2% increase in specific weight and an 88.5% increase in compressive strength, while for Example 6 there was a 28% increase in specific weight and a 125% increase in compressive strength. While, as expected, the absolute compressive strength declines with increase in the perlite-gypsum ratio both for the mix direct from the mixer and from the nozzle, the percentage increase in strength of the mix from the nozzle over the corresponding mix direct from the mixer unexpectedly is greater for the larger ratios of aggregate to gypsum. The significance and importance of this is apparent because it is possible, by the invention, to provide a structure of a strength which would require a much higher percentage or proportion of gypsum for equal strength of mortar emplaced in a conventional manner. Thus, for example, the nozzle-emplaced mix of Example 6, a 4:1 perlite-gypsum mix, has almost the identical compressive strength as the mix of Example 5, a 3:1 perlite-gypsum mix, taken direct from the mixer. The results are equally striking on a comparison of Examples 4 and 5.

Conversely, where maximum strength is desired or imperative, the examples show that increases in strength of from 37% for the mix of Example 4, 127% for the mix of Example 6 are possible by emplacement according to the invention and with no increase in the proportions of gypsum. The amount of air entrained depends upon the type of aggregate and the quantity of the aggregate. More air can be entrained in a vermiculite and perlite aggregate than with sand. The amount of air entrained increases with an increase of the aggregate to cement ratio. With more air entrained, of course, more air can be separated by the invention.

In the forming of mortar containing gypsum and an aggregate, it is common to incorporate substantial amounts of air. A retarder, when used with the gypsum to prevent quick setting when water is added thereto, is effective in incorporating air into the mix. Further, in the mixing of the gypsum with the aggregate, it is found that additional air is incorporated into the mix. In Example 4, the amount of air thus incorporated is shown to be 10%. In Example 5, the air content is shown to be 17%. In Example 6, the air content is shown to be 22%, while in Example 7 the air content is shown to be 6.5%. It is generally found that the mix contains at least 5% air, and since the air tends to weaken the resulting plaster wall, considerable research has been carried on in an effort to avoid the incorporation of air into the material. I have discovered that the difficulty can be overcome by removal of the air in the area of discharge, and thus providing a sturdy and dense plaster structure. By breaking up the material in the area of discharge so as to release the air, I find that approximately 80% or more of the air can be removed and a resulting dense plaster structure obtained.

Whether Portland cement or any hydraulic cement be employed, or whether gypsum be used as a binder, I find that by removing the protective coating about the air bubbles or air masses within the mortar, the air can be effectively removed. By subjecting the material to pressure pulsations at high frequencies, it is found that the air is removed and other mechanical means for this purpose may similarly be used.

The amount of air which is added to the mix through the use of an air entrainment agent or through the use of mechanical or mixer means, may vary according to the character of the material being handled, as, for example, when dealing with mortar containing lightweight aggregate as compared with mortar containing sand or heavier materials. Sufficient air should be added to give the mix a slump of from four inches to nine inches, or even higher. Ordinarily I prefer to add sufficient air to give the mix a slump of from five to six inches.

It will be understood that in the process of combining the materials, the sequence of adding or combining the various materials may be varied, but I prefer, for certain advantages, to first place the water in the container and then add the air-entraining agent and cementitious material.

An important phase of the invention is the utilization of the control method described herein for forming selectively large globules or small globules. In other words, the discharge apparatus may be modified by changing the relative dimensions of the nozzle parts as shown in Figs. 1 to 7, the orifices and orifice sizes, and the speed of revolution of the structure shown in Fig. 11, or the number of teeth employed in the gear structure shown in Fig. 10, etc., so that the resulting mass discharged is in the form of large globules or fine globules. The very important advantage from this is that the same mix may be employed for applying, for example, large globules to a lath structure where the large globules will tend to stick and form a body along the lath, while later an application of small and fine globules may be made, while still employing the same mix, for texturing the wall formed on the lath. Thus, in a single operation and while employing a single mix, it is possible to form a wall having decidedly different characteristics. Of course, if fine globules were discharged upon the lath, an unsatisfactory result would be obtained because the fine particles would travel through the metal lath, etc. and not form the desired mortar layer thereon. By employing the heavy globules in the first step, an effective coating is provided, and finally the desired finish is obtained through the application of the same mix in a fine globular particle size.

It will be understood that considerable variation may be made in the wall produced, depending upon the compressive strength required, the insulation value required, etc. For example, if it is desired to form a lightweight concrete wall having a strength of 1600 pounds per square inch, while affording good insulation, the discharge mechanism is adjusted to spray on, say, three inches of the material while eliminating the bulk of the air. Thereafter, the same mix may be sprayed onto the interior of the wall while removing a minimum of air in the mix. Thus there is produced a composite wall having a relatively strong three-inch outer width and an inner body of material which contains a substantial amount of air and has high insulation value. Should the wall be required to have only a 1,000 lb. p. s. i. compressive strength, the amount of air left in the wall may be greater and a three-inch wall could be formed having the 1,000 lb. p. s. i. compressive strength while employing a single adjustment which would remove a lesser amount of air. With the method of control herein shown, it is possible to employ a single mortar mix and by removing more or less of the air, which is introduced to give mobility to the mortar mix, the character of the wall constructed may be varied so as to give greater strength in certain parts and greater insulation values in other parts. By breaking the discharged material into globules of a predetermined size, a single mix can be employed to give all the varied results in wall structure above set out.

The term "mortar," as described above, is intended to include any cementitious material which may be employed with water and an aggregate in forming the mix. As above stated, a lightweight aggregate may be employed, or a heavy aggregate such as sand, including fine and large particles, may be employed.

While, in the foregoing specification, I have set forth specific steps and structures in detail for the purpose of illustrating embodiments of my invention, it will be understood that such details may be varied widely by those skilled in the art without departing from the spirit of my invention.

I claim:

1. The method of emplacing an aqueous mortar mix comprising mixing with an aggregate and cementitious material having a low water content which renders it non-flowable, an air-entraining agent to form air bubbles in the mixture and to render the mixture flowable, conveying the aerated mixture within an enclosed conduit to a point adjacent the place of application, and discharging the mixture upon said place of application while disrupting the bulk of the air bubbles to release the air therefrom at about the point of discharge.

2. The method of emplacing an aqueous mortar mix, comprising forming a wet mortar mix, introducing air into the mix to form air bubbles therein whereby the mortar which has only enough water to give it normally a slump of less than three inches, by reason of the air bubbles has a slump of from three to nine inches and is rendered flowable, conveying the aerated mixture within an enclosed conduit to a point adjacent the place of application, and there discharging the mix upon a surface while disrupting the bulk of the air bubbles to release the air therefrom at about the point of discharge.

3. The method of emplacing a mortar which comprises mixing cement containing an air-entraining agent with water and aggregate to form air bubbles in the mixture providing an air content in excess of five percent by volume, conveying the aerated mix within an enclosed conduit to a point adjacent the place of application, and discharging the mixture upon said place of application while disrupting the air bubbles to remove the bulk of the introduced air from the mixture at about the point of discharge.

4. The method of emplacing a mortar which comprises mixing gypsum containing an air-entraining agent, water and aggregate, whereby air bubbles are formed within the mix to provide an air content in excess of five per cent by volume, conveying the mixture within an enclosed conduit to a point adjacent the place of application, and discharging the mixture upon the place of application while removing the bulk of the introduced air from the mixture at about the point of discharge.

5. The method of emplacing an aqueous mortar mix upon a surface, comprising conveying within an enclosed conduit an aerated mortar mix permeated with air bubbles giving flowability to the mix and having an air content in excess of five percent by volume, and discharging the mix upon said area of application while disrupting the bulk of the air bubbles to release the air therefrom at about the point of discharge.

6. The process of claim 5, in which the mix is discharged in the form of discrete globules which fragment under the pressure of the air bubbles therein.

7. The process of claim 5, in which the mix is discharged in the form of discrete globules while maintaining the globules of a predetermined size to control the amount of air removed.

8. The method of emplacing an aqueous mortar mix upon a surface, comprising conveying within an enclosed conduit to a point adjacent the area of application an aerated mortar mix permeated with air bubbles which give it flowability and having an air content in excess of five percent by volume, and discharging the mix upon said area of application while disrupting substantially all of the air bubbles to release the air therefrom at about the point of discharge.

References Cited in the file of this patent

UNITED STATES PATENTS

| 1,583,918 | Dunn | May 11, 1926 |
| 2,174,051 | Winkler | Sept. 26, 1939 |
| 2,378,539 | Dawihl | June 19, 1945 |
| 2,504,805 | Clipson | Apr. 18, 1950 |
| 2,602,759 | Mollo | July 6, 1952 |
| 2,618,576 | Brown et al. | Nov. 18, 1952 |
| 2,650,412 | Dubbs | Sept. 1, 1953 |

FOREIGN PATENTS

| 481,811 | Germany | Aug. 29, 1929 |
| 533,043 | Great Britain | Feb. 5, 1941 |

OTHER REFERENCES

Engineering New Record, Oct. 10, 1940, pp. 471–474.